(12) United States Patent  
Bajpay et al.

(10) Patent No.: US 7,357,301 B1  
(45) Date of Patent: Apr. 15, 2008

(54) MAINTENANCE SUPPORT FOR HIGH PRIORITY CUSTOMERS

(75) Inventors: Paritosh Bajpay, Edison, NJ (US); Hossein Eslambolchi, Los Altos Hills, CA (US); John McCanuel, Bailey, CO (US); Sridar Seetharaman, Edison, NJ (US)

(73) Assignee: AT&T Corp., New York, NY (US)

( * ) Notice: Subject to any disclaimer, the term of this patent is extended or adjusted under 35 U.S.C. 154(b) by 98 days.

(21) Appl. No.: 11/320,528

(22) Filed: Dec. 29, 2005

(51) Int. Cl.  
*G06F 7/00* (2006.01)

(52) U.S. Cl. .................................. 235/376

(58) Field of Classification Search ............. 235/376; 379/9  
See application file for complete search history.

(56) References Cited

U.S. PATENT DOCUMENTS

| | | | |
|---|---|---|---|
| 5,437,009 A | | 7/1995 | Lane |
| 6,032,184 A | * | 2/2000 | Cogger et al. ............. 709/223 |
| 6,373,383 B1 | | 4/2002 | Arrowsmith et al. |
| 6,778,659 B2 | * | 8/2004 | Andersen ............... 379/265.02 |
| 2004/0111471 A1 | | 6/2004 | Stoner et al. |
| 2005/0131943 A1 | | 6/2005 | Lewis et al. |
| 2007/0116185 A1 | * | 5/2007 | Savoor et al. ................. 379/9 |

* cited by examiner

*Primary Examiner*—Daniel Hess  
*Assistant Examiner*—April A. Taylor

(57) ABSTRACT

A method includes receiving a problem ticket, which contains a priority level indicator and a customer identifier, that describes a telecommunications network event such as a problem. The problem ticket is associated with and transmitted to a workcenter and a portion within the workcenter based on at least any one of the priority level indicator and the customer identifier. Other personnel are notified about the problem ticket based on the priority level indicator and the customer identifier.

19 Claims, 4 Drawing Sheets

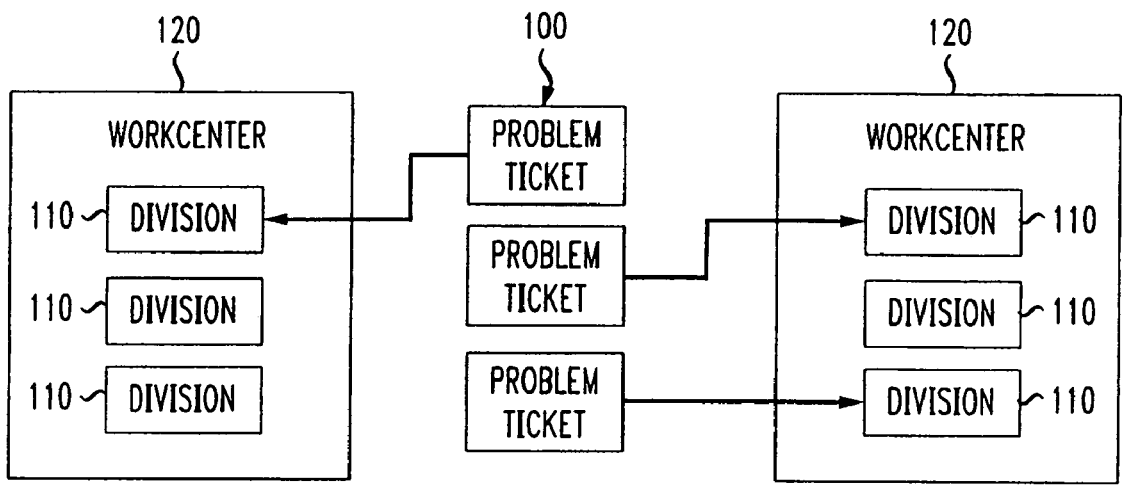

MAINTENANCE SUPPORT FOR HIGH PRIORITY CUSTOMERS

FIELD OF INVENTION

The invention relates generally to telecommunication networks, and more particularly to the routing of problem tickets for telecommunications network customers.

BACKGROUND

Telecommunication network services are a crucial part of the infrastructure for businesses and individual customers. Because these resources are so important, businesses and individual customers will frequently pay a premium to telecommunications providers to become a high priority customer to receive more reliable telecommunications service. To meet the demand of these high priority customers, providers often allocate resources, such as workcenters and divisions within workcenters, specifically for resolving their problems. However, problem tickets may not be quickly and/or properly routed to the resources set aside for high priority customers. Problem tickets, which describe problems with telecommunications services, are created in a general ticketing system that cannot distinguish between normal and high priority customers. The disconnect between the ticketing system which tracks problems and resources which resolve problems can result in an intolerable delay of the resolution of problems for high priority customers. Thus, there is a need for a method to route a problem ticket from a general ticketing system to workcenters and divisions within workcenters set aside for resolving the problems of high priority customers.

SUMMARY OF THE INVENTION

A method includes receiving a problem ticket, which contains a priority level indicator and a customer identifier, that describes a telecommunications network event such as a problem. The problem ticket is associated with and transmitted to a workcenter and a portion within the workcenter based on at least any one of the priority level indicator and the customer identifier. Other personnel are notified about the problem ticket based on the priority level indicator and the customer identifier.

BRIEF DESCRIPTION OF THE DRAWINGS

FIG. 1 is a schematic diagram illustrating an embodiment of the invention.

FIG. 2 is a table illustrating information contained in problem tickets.

DETAILED DESCRIPTION

Figure 3:
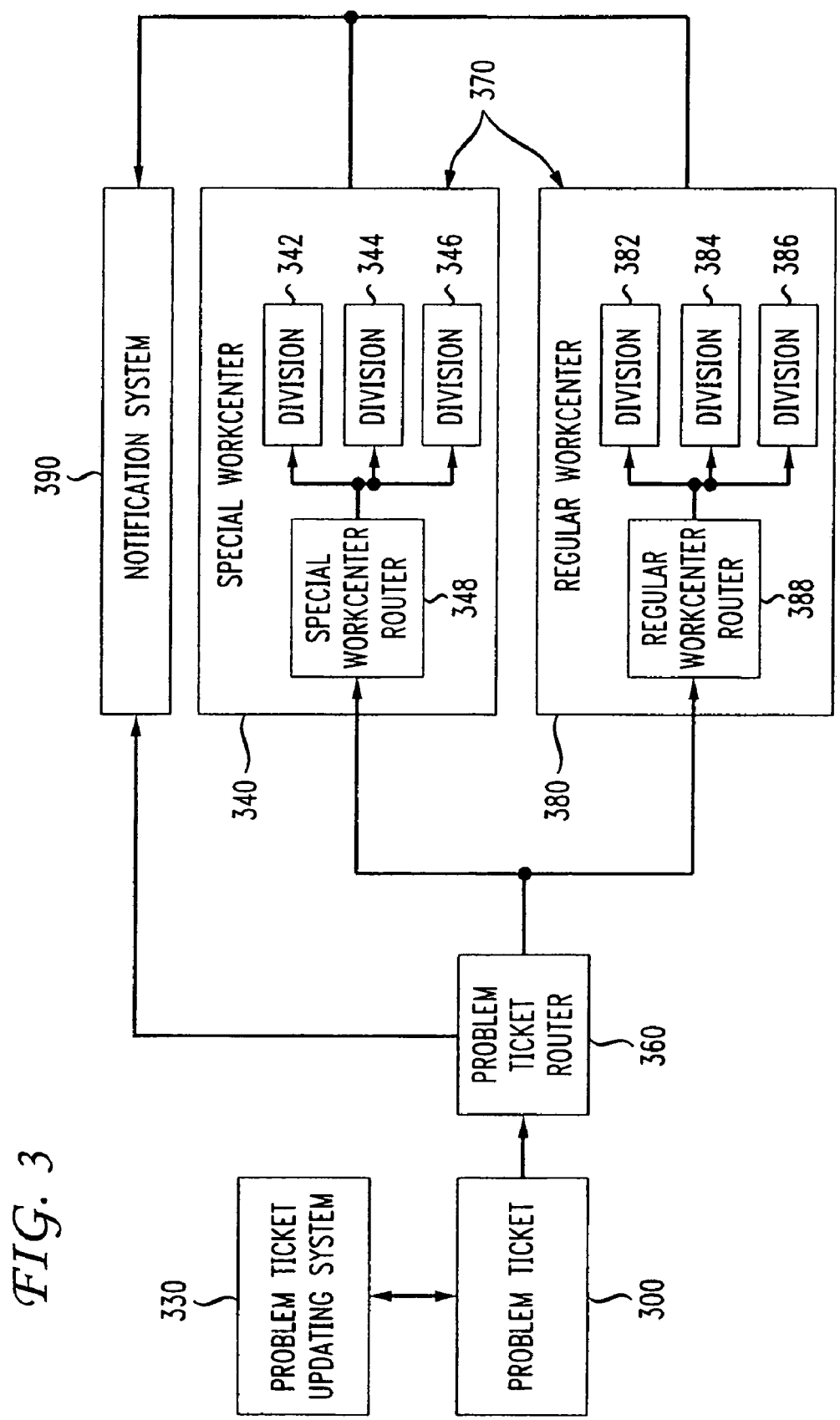
FIG. 3 is a schematic diagram illustrating an embodiment of the invention.

FIG. 1 is a diagram that illustrates the routing of several problem tickets 100 describing problems within a telecommunications network to one of several divisions 110 within workcenters 120. The workcenters 120 are administrative groups that include telecommunications network specialists who are trained to resolve problems or network events that are described in the problem tickets 100. The workcenters 120 are divided into divisions 110 that are further specialized to resolve problems, for example, for specific customers or customer within specific regions of the telecommunications network. The problem tickets 100 are routed to the specific division 110 that is established within the workcenter 120 for resolving the particular problem described in the problem ticket 100. The problem tickets 100 are routed based on a customer identifier and based on a priority level indicator that are contained within each of the problem tickets 100.

The problem tickets 100 each describe a telecommunications network event, such as a problem within a telecommunications network, including software problems and/or hardware problems that can be causing issues such as intermittent service, outages, or delays. The problem tickets 100 include information such as the date, time, description, and status of the problem and can be created using a ticketing system that collects information about telecommunications network problems reported by customers and/or network administrators.

The problem tickets 100 can also be created by a system that actively monitors network facilities and creates the problem tickets 100 when an alarm indicating that a problem, such as an outage, has occurred. The alarm can contain information that can be used to create the problem tickets 100 or can simply prompt a network administrator to investigate the alarm and later create the problem ticket(s) 100.

The problem tickets 100 can be parent problem tickets and/or child problem tickets. A parent problem ticket is a problem ticket that describes a broad problem or root cause problem that covers a collection of related child problem tickets. For example, several customers may report one or more problems that are described in several separate problem tickets. An analysis of each of the problem tickets reported by each of the customers may reveal that the problems, although reported separately, are caused by a single issue. A parent problem ticket can be created that describes the single issue and each of the customer problem tickets can be linked to the parent problem ticket as child problem tickets.

The problem ticket 100 can be an alarm message, an advisory message, or any other message associated with an event that is affecting or may potentially affect a telecommunications network element. An alarm message is a message generated by the network element to indicate that conditions exist that have resulted in or can result in a failure of the network element. For example, an alarm message can indicate that the network element has lost power and is running on a backup power supply.

FIG. 2 is a table that illustrates several problem tickets 200 with corresponding customer identifiers 204 and priority level indicators 202. The customer identifier 204 is a five digit code that is used to identify a customer affected by the problem described in the problem ticket 100. In this embodiment, the customer identifiers 204 are general customer identifiers used by the customer for all transactions related to the telecommunications network. In some embodiments, the customer identifier 204 can be any combination of characters and/or numbers and can be a single use identifier created specifically for use in the problem ticket 200.

The priority level indicators 202 indicate the priority level associated with the telecommunications service affected by the problems described in the problem tickets 200. Telecommunications services that require a higher level of services and resources are assigned a higher priority level. The figure shows three priority levels, critical watch, special watch, and normal, for the problem tickets PT1, PT2, and PT3, respectively. In the priority level system described in this figure, critical watch is the highest priority level and normal is the lowest priority level.

When the problem ticket 200 is created, the priority level indicator 202 and the customer identifier 204 are included in the problem ticket 200. The priority level indicator 202 and customer identifier 204 can be automatically included by referencing a database that contains information about the customer reporting the problem and information about the telecommunications services that are affected or included by a ticketing agent and/or system that creates the problem ticket 200. The ticketing agent and/or system can require that a priority level indicator and customer identifier be included in the problem ticket 200 for the problem ticket 200 to be a valid ticket.

In some embodiments, the priority level indicator 102 can be a unique code, such as an alphanumeric code, that corresponds to a priority level. Also, priority level systems can contain any number of priority levels to classify telecommunications services for customers.

FIG. 3 is a schematic diagram that illustrates the routing of a problem ticket 300, based on the analysis of a customer identifier and a priority level indicator, to one of two workcenters 370, a special workcenter 340 or a regular workcenter 380. The special workcenter 340 and its divisions, 342, 344, and 346, are established for resolving high priority problems and the regular workcenter 380 and its divisions, 382, 384, and 386, are established for resolving low priority problems. Notifications about the problem ticket 300 are sent through a notification system 390 to parties associated with or a targeted audience associated with the problem ticket 300 based on the customer identifier and the priority level indicator.

The priority level indicator is used by the problem ticket router 360 to route the problem ticket to the workcenter 370 that is allocated for resolving the problem described in the problem ticket 300. The routing can be accomplished by the problem ticket router 360 by referencing a table in a database that indicates which priority level indicators are to be routed to which workcenters. One or more priority levels can be assigned to be routed to a single workcenter. For example, problem tickets with either a critical watch priority level or a special watch priority level can be routed to the special workcenter 340.

In this embodiment, all problem tickets 300 involving a telecommunications service that has been assigned a high priority level are routed to the special workcenter 340. The special workcenter is a workcenter with the resources available to rapidly respond to and resolve high priority problems. Problem tickets 300 involving telecommunications services with lower priority levels are routed to the regular workcenter 380.

After being received in one of the workcenters 370, the problem ticket 300 is further routed by the router within the workcenter, using the customer identifier, to the appropriate division within the workcenter. In the special workcenter 340, the problem ticket is routed by the special workcenter router 348 using the customer identifier 340 to one of three divisions, 342, 344, or 346. In the regular workcenter 380, the problem ticket is routed by the regular workcenter router 388 using the customer identifier 360 to one of three divisions, 382, 384, or 386.

The routing within one of the workcenters 370 to a specific division using the customer identifier 360 can be based on variables such as region, customer type, and/or problem type. For example, if each of the divisions within the workcenters 370 resolves problem tickets 300 only for a particular region of the telecommunications network, a database can be referenced using the customer identifier to identify where the customer is located so that the problem ticket 300 can be routed to the appropriate division. In some embodiments, problem tickets 300 can be routed to divisions that resolve issues for only certain customers. In this situation, the problem ticket 300 can be properly routed by querying a database that indicates which divisions resolve problem tickets 300 for particular customers.

In some embodiments, the routing of problem tickets 300 to one of the workcenters 370 can be dynamically determined. For example, if the special workcenter 340, which normally resolves high priority issues, is congested with a high volume of problem tickets 300, the lowest priority level of the high priority level problem tickets 300 can be routed to another workcenter such as the regular workcenter 380 for resolution. To dynamically route the problem tickets 300, the problem ticket 300 will be routed based not only on the priority level indicator 102, but also on workcenter capacity and problem ticket volume information.

The routing of problem tickets 300 to divisions within a workcenter such as the special workcenter 340 can also be accomplished dynamically. For example, if a division within a workcenter that typically resolves issues for a selected customer is congested with problem tickets 300 for that customer, the problem ticket 300 can be routed to a different division based on a capacity analysis of the divisions within the workcenter.

In this embodiment, when the problem ticket 300 is routed to either of the workcenters 370 or to one of the divisions within the workcenters 370, a notification is sent via a notification system 390 to the appropriate telecommunications network administrators and/or other personnel based on the priority level indicator and customer identifier. For example, a manager of an account related to a specific customer, who is not part of one of the workcenters 370, can receive notification that the specific customer is affected by a problem ticket 300 through the notification system 390. The information in the problem ticket 300 can be sent to the manager based on the customer identifier and using a database that links the customer identifier to the manager. The problem ticket 300 can also be routed to a manager of a workcenter 370 who can analyze the information in the problem ticket 300 and can override the routing based on the priority level indicator and customer identifier if necessary. Notifications are also sent out via the notification system 390 to targeted audiences when a division within either of the workcenters 370 makes changes to the problem ticket 300 and/or resolves the issue in the problem ticket 300.

In some embodiments, the problem ticket 300 can contain multiple customer identifiers and/or priority level indicators. A problem ticket 300 can contain multiple customer identifiers if the problem described in the problem ticket 300 will affect multiple customers. In addition, each of the telecommunications services used by each of the customers affected by the problem may be assigned different priority level indicators. The problem ticket router 360, special workcenter router 348, and/or regular workcenter router 388, can route the problem ticket 300 with multiple customer identifiers and corresponding priority level indicators based on rules stored within each router.

For example, the problem ticket router 360 can be programmed to route a problem ticket 300 with multiple priority levels and/or customer identifiers based on the highest priority level contained in the problem ticket. The special workcenter router 348 and/or regular workcenter router 388 can be programmed to further route the problem ticket 300 with multiple priority levels and/or customer identifiers based on a table containing information that prioritizes specific customers. The rules for each of the routers 348, 360, and 388 to deal with multiple priority levels and/or customer identifiers can be programmed on the router and/or can be contained in a table in a separate database that is referenced by the routers 348, 360, and 388.

In this embodiment, a problem ticket updating system 330 analyzes the problem ticket 300 to ensure that the problem ticket 300 contains valid and up to date customer identifiers and priority level indicators. The problem ticket updating system 330 can also analyze the problem in the problem ticket 300 to proactively determine if other customers will be affected by the problem described in the problem ticket 300. If other customers will be affected by the problem, the problem ticket updating system 330 will add the customer identifiers and corresponding priority levels associated with the customers to the problem ticket 300.

The problem ticket updating system 330 also can add default values to the problem ticket 300 when the values for the customer identifier and priority level indicator are empty. The default values can be values that will automatically cause the problem ticket 300 to be routed, for example, as a high priority problem ticket.

Figure 4:
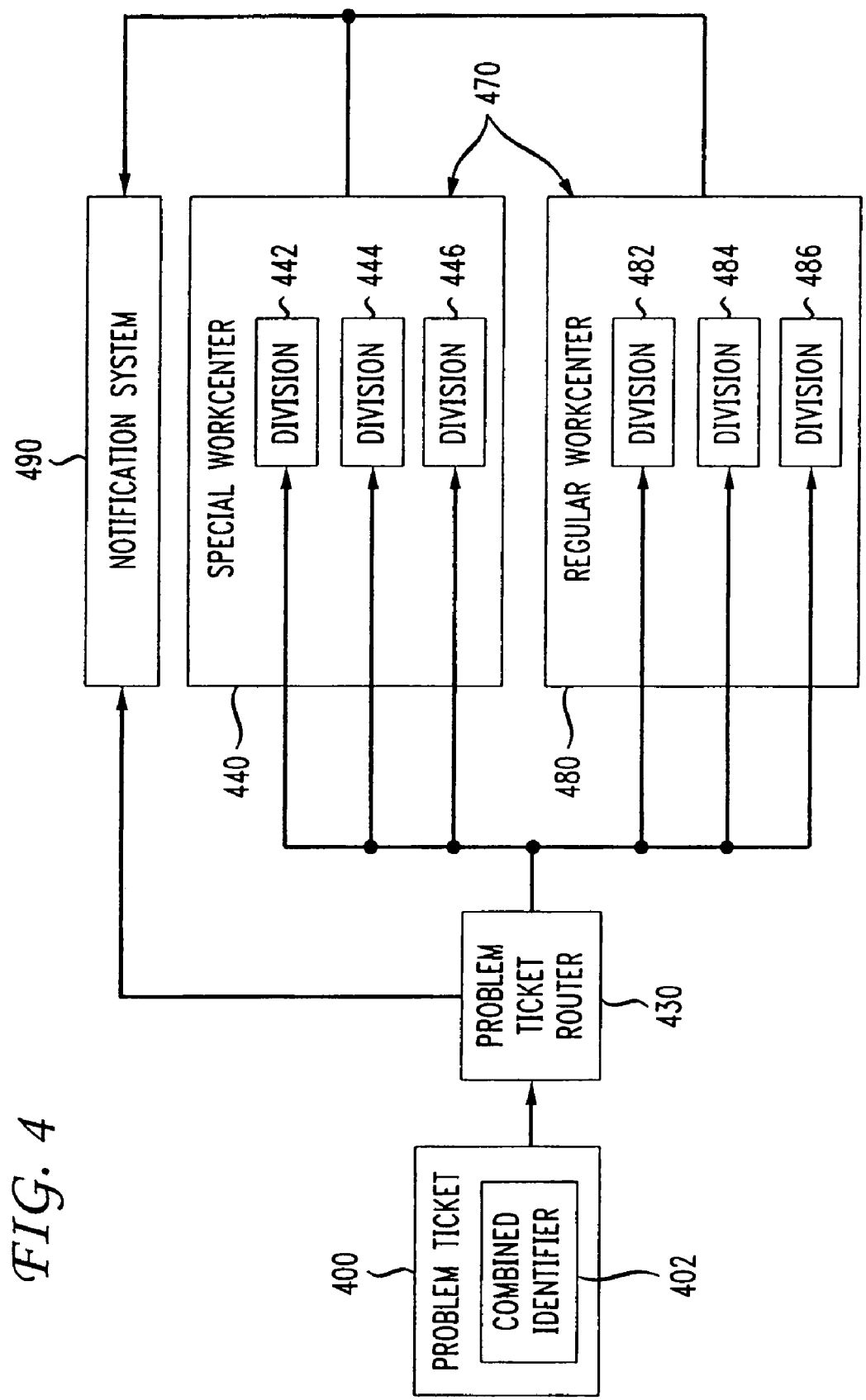
FIG. 4 is a schematic diagram illustrating an embodiment of the invention.

FIG. 4 is a schematic diagram that illustrates the routing of a problem ticket 400 based on the analysis of a combined identifier 402 to one of two workcenters 470, a special workcenter 440 or a regular workcenter 480. In this embodiment, a single router, a problem ticket router 430, uses the combined identifier 402 to route the problem ticket 400 to one of the divisions 442, 444, 446, 482, 484, and 486 within one of the workcenters 470. The problem ticket router 430 references a database that contains information that links the combined identifier 402 to the specific division within the workcenter 470 that is assigned for resolving the problem described in the problem ticket 400. Also, in this embodiment, notifications about the problem ticket 400 are sent through a notification system 490 to parties associated with or a targeted audience associated with the problem ticket 400 based on the combined identifier 402 within the problem ticket 400.

Figure 5:
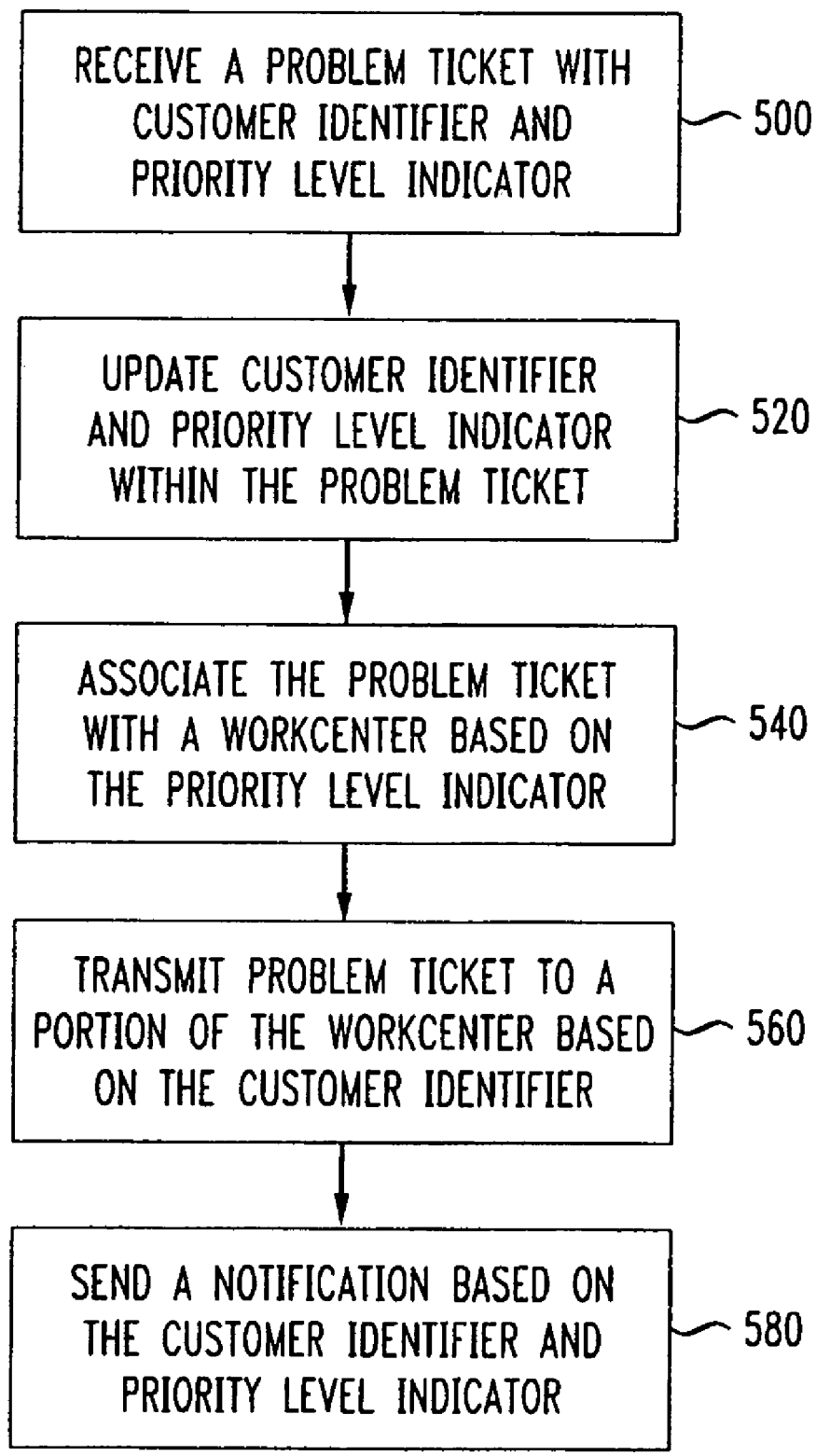
FIG. 5 is a flowchart illustrating an embodiment of the invention.

FIG. 5 is a flowchart that describes the routing of a problem ticket to a workcenter based on a customer identifier and a priority level indicator. In this flowchart, a problem ticket with a customer identifier and a priority level indicator is received 500. The problem ticket is a problem ticket describing a problem with a telecommunications network. The problem ticket can contain multiple customer identifiers and/or multiple priority level indicators. The problem ticket can be a parent or a child problem ticket.

The problem ticket is updated 520 based on information contained in a database with up to date customer identifier and priority level indicator information. The priority level indicator and/or customer identifier, if outdated, can be updated for the problem ticket to be properly routed to a portion of a workcenter.

The problem ticket is associated with a workcenter based on the priority level indicator 540. The workcenter is a workcenter assigned to resolve issue(s) described in the problem ticket with the specified priority level. If the problem ticket contains multiple priority level indicators, the problem ticket can be associated to the workcenter based on, for example, the highest priority level indicator contained in the problem ticket.

The problem ticket is transmitted to the appropriate portion of the workcenter based on the customer identifier contained in the problem ticket 560. The problem ticket can be routed by referencing, for example, a database that contains information that links the customer identifier to the specific portion of the workcenter.

In this embodiment, a notification is sent to parties associated with the problem ticket based on the customer identifier and the priority level indicator 580. Although in this flowchart, the notification is sent after the problem ticket has been routed to the appropriate division of the workcenter, in some embodiments, the notification can be sent before or simultaneous to the routing of the problem ticket. Also, notification about the problem ticket can be sent based on either the customer identifier or the priority level indicator.

In some embodiments, the problem ticket can be associated to the workcenter based on the customer identifier, rather than on the priority level indicator, and the problem ticket can be associated with the portion of the workcenter based on the priority level indicator, rather than on the customer identifier. Also, the association of the problem ticket with the workcenter and portion of the workcenter can be accomplished in any order using any number of routers and databases.

While various embodiments of the invention have been described above, it should be understood that they have been presented by way of example only, and not limitation. For example although the method for managing network event messages is shown and described as including a determination of the whether the indication is associated with an advisory message or alarm message before determining whether the indication is associated with a predefined circuit, in some embodiments, the determination of whether the indication is associated with a predefined circuit is done first.

Similarly, although the specific response procedure is shown and described with a specific order of the monitoring operations, those operations can be rearranged in any order. Furthermore, the monitoring operations need not occur in a serial fashion, but can occur in parallel.

What is claimed is:

1. A method comprising:
receiving a problem ticket associated with a telecommunications network event, the problem ticket being associated with a priority level indicator and a customer identifier;
associating the problem ticket with a workcenter selected from a plurality of workcenters having different priority levels based on at least any one of the priority level indicator and the customer identifier; and
transmitting the problem ticket to a portion of the workcenter based on at least any one of the priority level indicator and the customer identifier.

2. The method of claim 1, wherein the priority level indicator and the customer identifier are associated with the problem ticket when the problem ticket is created.

3. The method of claim 1, further comprising sending a notification to a targeted audience based on at least any one of the customer identifier and the priority level indicator.

4. The method of claim 1, wherein the priority level indicator is an alphanumeric code contained in the problem ticket.

5. The method of claim 1, wherein the customer identifier is an alphanumeric code contained in the problem ticket.

6. The method of claim 1, further comprising updating the priority level indicator in the problem ticket.

7. The method of claim 1, further comprising updating the customer identifier in the problem ticket.

8. The method of claim 1, wherein the associating the problem ticket with the workcenter based on at least any one of the priority level indicator and the customer identifier is dynamically executed.

9. The method of claim 8, wherein the dynamic execution is based on a capacity analysis.

10. The method of claim 1, wherein the workcenter is a telecommunications network workcenter.

11. The method of claim 1, wherein the priority level indicator and the customer identifier are contained in a combined identifier.

12. The method of claim 1, wherein the priority level indicator is assigned a default priority level indicator when the value of the priority level indicator is empty.

13. The method of claim 1, wherein the customer identifier is assigned a default customer identifier when the value of the customer identifier is empty.

14. The method of claim 1, wherein the portion of the workcenter is the default portion of the workcenter when the value is empty for at least any one of the priority level indicator and the customer identifier.

15. The method of claim 1, wherein the problem ticket associated with the telecommunications network event is an alarm message.

16. The method of claim 1, wherein the problem ticket contains a multiplicity of customer identifiers.

17. The method of claim 1, wherein the problem ticket contains a multiplicity of priority level indicators.

18. The method of claim 1, wherein the telecommunications network event is a telecommunications network problem.

19. The method of claim 1, wherein the problem ticket is a child problem ticket.

* * * * *